United States Patent
Al-Rawhani et al.

(10) Patent No.: US 11,105,679 B2
(45) Date of Patent: Aug. 31, 2021

(54) EXTENDED HOLD-OFF TIME FOR SPAD QUENCH ASSISTANCE

(71) Applicant: STMicroelectronics (Research & Development) Limited, Marlow (GB)

(72) Inventors: Mohammed Al-Rawhani, Glasgow (GB); Bruce Rae, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 0 days.

(21) Appl. No.: 16/711,832

(22) Filed: Dec. 12, 2019

(65) Prior Publication Data

US 2021/0181016 A1    Jun. 17, 2021

(51) Int. Cl.
*H01L 31/107* (2006.01)
*G01J 1/44* (2006.01)

(52) U.S. Cl.
CPC ........... *G01J 1/44* (2013.01); *G01J 2001/442* (2013.01); *G01J 2001/4466* (2013.01)

(58) Field of Classification Search
CPC ...... G01J 1/44; G01J 1/46; G01T 1/17; G01T 1/2018; H01L 27/1446; H01L 31/035236; H01L 31/1075; H01L 31/107; H01L 27/14643
USPC .......................................... 250/214 R, 214.1
See application file for complete search history.

(56) References Cited

U.S. PATENT DOCUMENTS

| 4,963,727 | A | 10/1990 | Cova |
| 8,188,563 | B2 | 5/2012 | Finkelstein et al. |
| 9,024,246 | B2 | 5/2015 | Jiang et al. |
| 10,852,399 | B2 * | 12/2020 | Fenigstein ........ H01L 31/02005 |
| 2018/0209846 | A1 | 7/2018 | Mandai et al. |
| 2019/0123215 | A1 | 4/2019 | Stark |
| 2019/0302242 | A1 | 10/2019 | Fenigstein et al. |

FOREIGN PATENT DOCUMENTS

CN    103148950 A    6/2013

OTHER PUBLICATIONS

Abbas, et al., "Backside illuminated SPAD image sensor with 7.83 µm pitch in 3D-stacked CMOS technology," 2016 IEEE International Electron Devices Meeting (IEDM), Dec. 2016, pp. 8.1.1 thru 8.1.4.

(Continued)

*Primary Examiner* — Que Tan Le
(74) *Attorney, Agent, or Firm* — Crowe & Dunlevy

(57) ABSTRACT

A photodetection circuit includes a single photon avalanche diode (SPAD), and an active quenching circuit coupling the SPAD to an intermediate node and having a variable RC constant. The variable RC constant provides a first RC constant during an idle state so that when the SPAD detects a photon, the SPAD avalanches to begin quenching to set a magnitude of a voltage at a terminal of the SPAD to a quench voltage, the quench voltage being greater than a threshold voltage; a second RC constant greater than the first RC constant during a hold off period during which the quenching occurs so as to maintain the voltage at the terminal of the SPAD at a magnitude that is above the threshold voltage during the hold off period; and a third RC constant less than the second RC constant but greater than the first RC constant during a recharge period during which the SPAD is recharged.

17 Claims, 4 Drawing Sheets

(56) References Cited

OTHER PUBLICATIONS

Niclass, et al., "A miniature actively recharged single-photon detector free of afterpulsing effects with 6ns dead time in a 0.18 μm CMOS technology," 2010 International Electron Devices Meeting, Dec. 2010, pp. 14.3.1 thru 14.3.4.

Bronzi, et al: "Fast Sensing and Quenching of CMOS SPADs for Minimal Afterpulsing Effects," IEEE Photonics Technology Letters, vol. 25, No. 8, Apr. 15, 2013, pp. 776 thru 779.

* cited by examiner

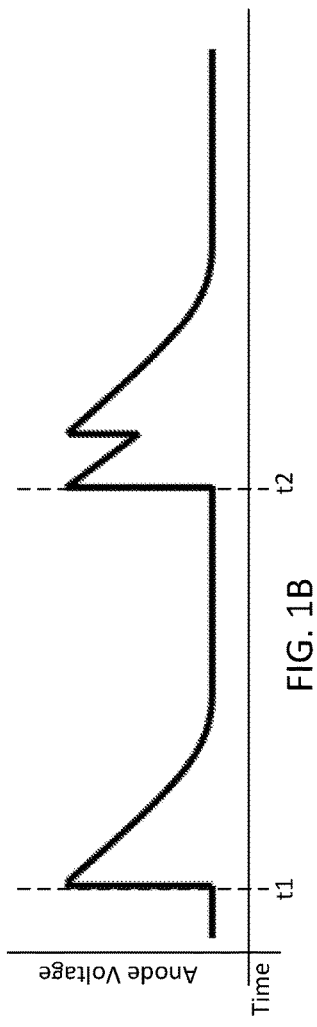
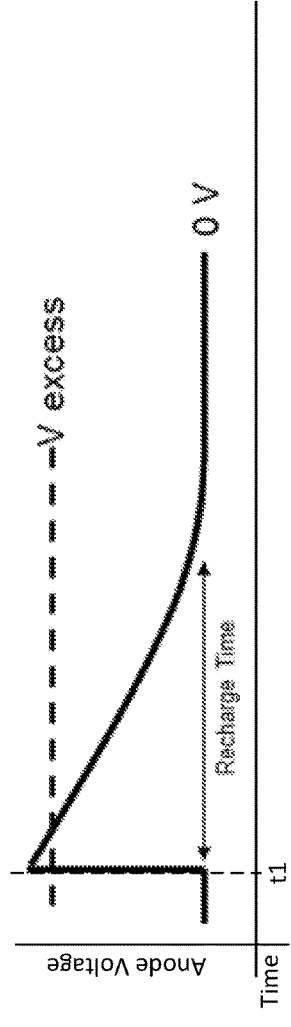
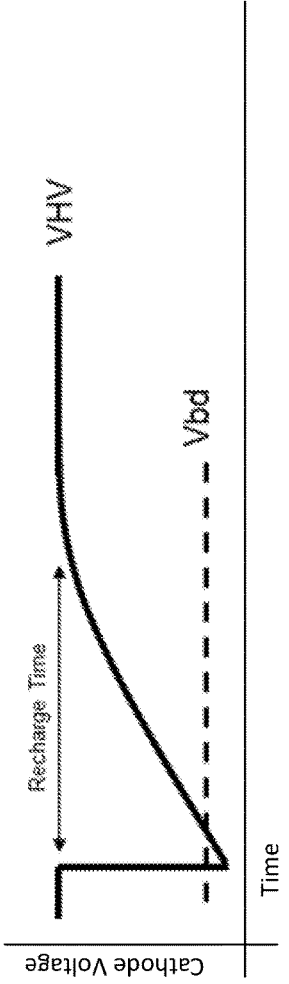
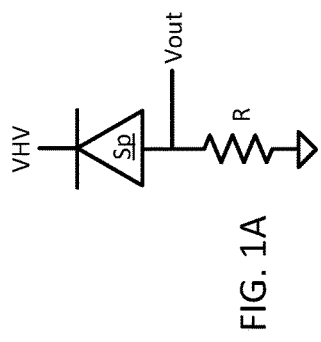
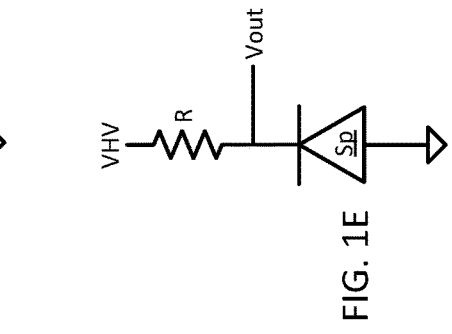
FIG. 1A
FIG. 1B
FIG. 1C
FIG. 1D
FIG. 1E
FIG. 1F

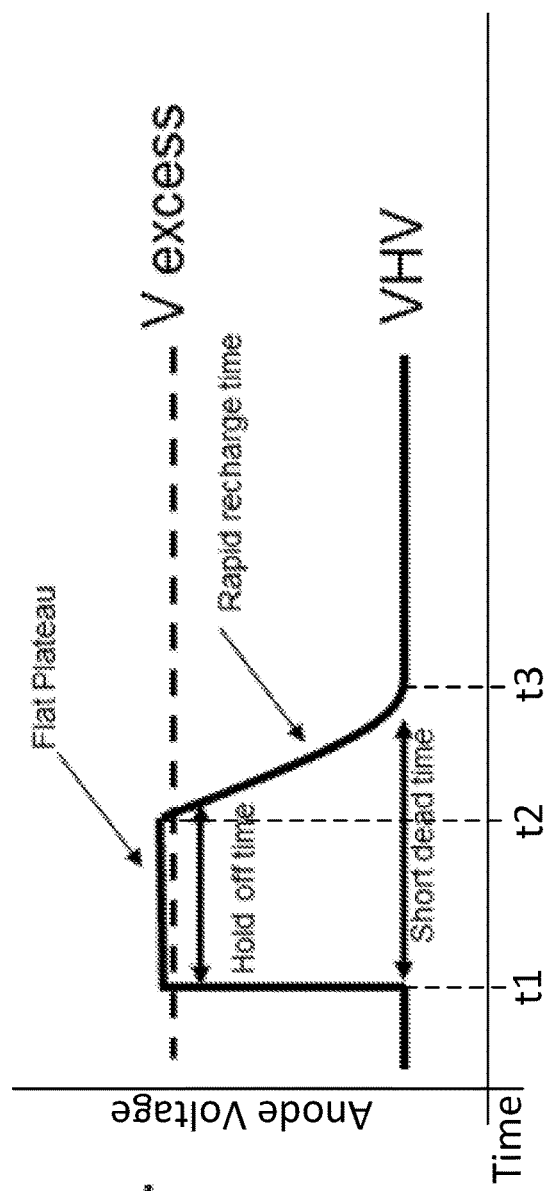
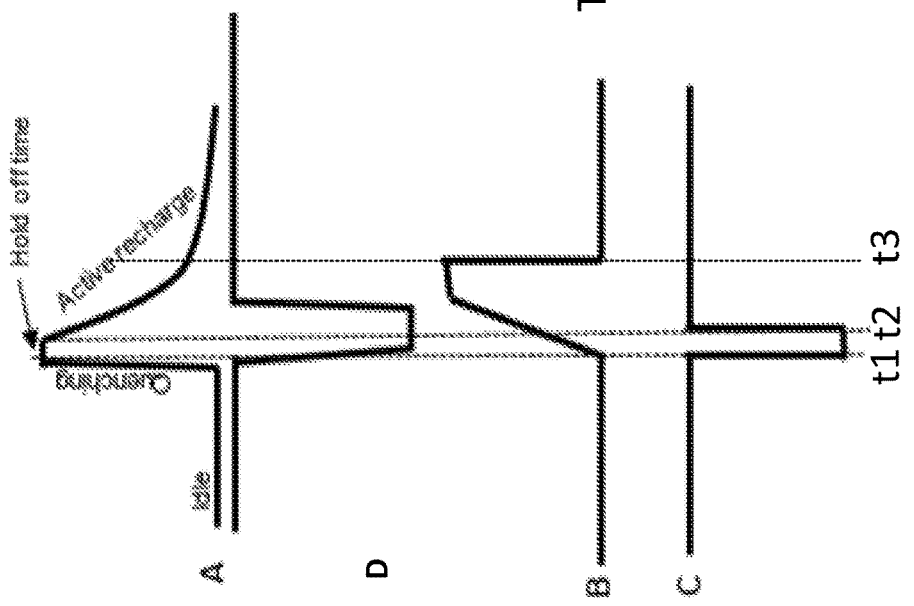
FIG. 3B
FIG. 3A

EXTENDED HOLD-OFF TIME FOR SPAD QUENCH ASSISTANCE

TECHNICAL FIELD

This application is directed to an active quenching circuit for fully quenching a single photon avalanche diode (SPAD) after an avalanche discharge by sustaining a long hold-off time after quenching, and then rapidly recharging the SPAD to achieve a short dead time.

BACKGROUND

Single photon avalanche diode (SPAD) photodetectors are based on a PN junction that is reverse biased at a voltage exceeding a breakdown voltage. When a photon-generated carrier (via the internal photoelectric effect) is injected into the depletion region of the PN junction, a self-sustaining avalanche is caused, and detection of this avalanche can be used to indicate detection of the photon that generated the carrier. In order to allow the PN junction to be reset so as to detect further photons, the SPAD is quenched, which is to say that the carriers are flushed from the depletion region.

Such SPADs are utilized in applications such as time of flight (ToF) ranging and light ranging and detection (LIDAR). These applications may utilize fully depleted SPADs due to their suitability for near infrared applications. A sample SPAD circuit is shown in FIG. 1A in which a fully depleted SPAD Sp has its cathode connected to a high voltage VHV and its anode connected to a pull down circuit, which here is a resistor R with a small resistance to help ensure a short deadtime, with output being taken at the anode. The anode voltage over time in an ideal case is shown in the first spike in the generated output signal occurring at time t1 in FIG. 1B, where a quick rise in the signal is followed by a steady decay. However, fully depleted SPADs suffer from a low quench efficiency, meaning that they suffer from an inability to fully flush charge carriers out of the depletion region. This may result in real world performance similar to the second spike occurring at time t2 in FIG. 1B, where rather than a single peak, dual voltage peaks for the output signal are generated, widening the output pulse from the SPAD, reducing the rate at which photodetection can be performed.

Therefore, passive quenching circuits, with a larger quenching resistor than in FIG. 1A (such as on the order of hundreds of Ohms), have been designed to assist with quenching SPADs. One such circuit is shown in FIG. 1C, where a SPAD Sp has its cathode connected to the high voltage VHV, and its anode connected to ground through a large quench resistor R, with the output being taken at the anode of the SPAD Sp. The inclusion of the large quench resistor R increases the recharge time in an attempt to ensure that no charge carriers remain in the depletion region after avalanche. Because of this, the subsequent spike looks like the t1 pulse of FIG. 1D and not the t2 pulse of FIG. 1B.

Another such circuit is shown in FIG. 1E, where a SPAD Sp has its cathode connected to the high voltage VHV through large quench resistor R, and its anode connected to ground, with the output being taken at the cathode of the SPAD Sp. As can be seen in FIG. 1F, here the inclusion of the large quench resistor R also increases the recharge time in an attempt to ensure that no charge carriers remain in the depletion region after avalanche.

While these passive quenching circuits may be effective in some scenarios at an expense of very long dead time, in others they may still not be successful in achieving full quench. Therefore, active quenching systems have been developed, such as that described in U.S. Patent Publication No. 2019/0123215. However, such active quenching systems may still not achieve full quench, and may introduce drawbacks such as an increase in dead time (the time period between an avalanche and the SPAD being quenched and ready to avalanche again), which reduces the maximum count rate at which photodetection can be performed.

As such, further improvements in active quench circuits are necessary.

SUMMARY

Disclosed herein is a photodetection circuit including a single photon avalanche diode (SPAD), and an active quenching circuit coupling the SPAD to an intermediate node. The active quenching circuit has a variable RC constant. The active quenching circuit is configured: to have a first RC constant during an idle state so that when the SPAD detects a photon, the SPAD avalanches to begin quenching to set a magnitude of a voltage at a terminal of the SPAD to a quench voltage, the quench voltage being greater than a threshold voltage; have a second RC constant greater than the first RC constant during a hold off period during which the quenching occurs so as to maintain the voltage at the terminal of the SPAD at a magnitude that is above the threshold voltage during the hold off period; and have a third RC constant less than the second RC constant but greater than the first RC constant during a recharge period during which the SPAD is recharged.

Also disclosed herein is a photodetection circuit including: a single photon avalanche diode (SPAD) having a cathode coupled to a high voltage supply and an anode coupled to a first node; a first n-channel transistor having a drain coupled to the first node, a source coupled to ground, and a gate coupled to a third node; a second n-channel transistor having a drain coupled to the first node, a source coupled to ground, and a gate coupled to a second node; an inverter having an input coupled to the first node and an output coupled to an intermediate node; a current starved inverter having an input coupled to the intermediate node and an output coupled to the second node; and a logic gate having inputs coupled to the intermediate node and the second node, and an output coupled to the third node.

Method aspects are also disclosed herein. For example, a method disclosed herein includes changing an RC constant of an active quenching circuit for a single photon avalanche diode (SPAD) to: have a first RC constant during an idle state so that when the SPAD detects a photon, the SPAD avalanches to begin quenching to set a magnitude of a voltage at a terminal of the SPAD to a quench voltage, the quench voltage being greater than a threshold voltage; have a second RC constant greater than the first RC constant during a hold off period during which the quenching occurs so as to maintain the voltage at the terminal of the SPAD at a magnitude that is above the threshold voltage during the hold off period; and have a third RC constant less than the second RC constant but greater than the first RC constant during a recharge period during which the SPAD is recharged.

BRIEF DESCRIPTION OF THE DRAWINGS

FIG. 1A is a schematic diagram of a prior art SPAD based photodetection circuit.

FIG. 1B is a graph of anode voltage of the photodetection circuit of FIG. 1A over time in an ideal case, and in a real-world case where the SPAD is fully depleted.

FIG. 1C is a schematic diagram of a first prior art SPAD based photodetection circuit with passive quenching.

FIG. 1D is a graph of the anode voltage of the photodetection circuit of FIG. 1C over time, showing the increased recharge time over the design of FIG. 1A.

FIG. 1E is a schematic diagram of a second prior art SPAD based photodetection circuit with passive quenching.

FIG. 1F is a graph of the cathode voltage of the photodetection circuit of FIG. 1E over time, showing the increased recharge time over the design of FIG. 1A.

FIG. 3A is a graph showing voltages at nodes A, B, and C of the photodetection circuit of FIG. 2 in operation.

FIG. 3B is a graph showing the voltage at the anode of the SPAD of the photodetection circuit of FIG. 2 in operation.

DETAILED DESCRIPTION

Figure 2:
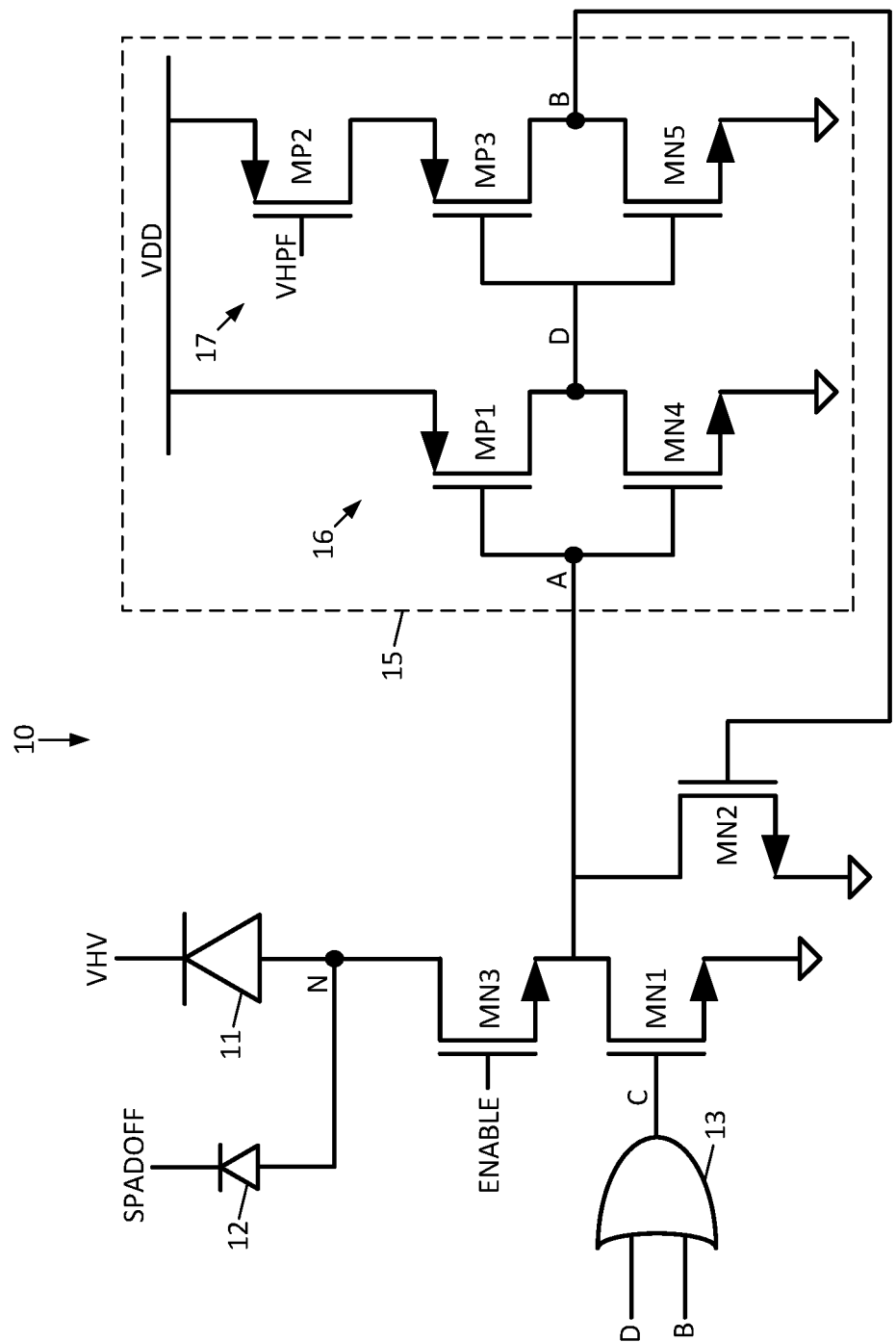
FIG. 2 is a schematic diagram of a SPAD based photodetection circuit disclosed herein which fully quenches the SPAD.

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Now described is a photodetection circuit 10 with active quenching. The photodetection circuit 10 includes a fully depleted single photon avalanche diode (SPAD) 11 having a cathode connected to a high voltage VHV and an anode connected to node N. A clamp diode 12 has a cathode connected to a SPAD turnoff signal SPADOFF and an anode connected to node N.

An n-channel transistor MN3 has its drain connected to node N, its source connected to node A, and its gate connected to the enable signal ENABLE. An n-channel transistor MN1 has its drain connected to node A, its source connected to ground, and its gate connected to the output of OR gate 13 at node C. An n-channel transistor MN2 has its drain connected to node A, its source connected to ground, and its gate connected to node B. The OR gate 13 has inputs coupled to node D and node B, and its output coupled to node C.

A starved delayed buffer 15 is connected between nodes A and B, and is comprised of an inverter 16 having its input connected to node A and its output connected to node D, and a starved inverter 17 having its input connected to node D and an output connected to node B. The inverter 16 is comprised of: p-channel transistor MP1 having its source connected to a supply voltage VDD, its drain connected to the node D, and its gate connected to node A; and n-channel transistor MN4 having its drain connected to the node D, its source connected to ground, and its gate connected to node A. The starved inverter 17 is comprised of: p-channel transistor MP2 having its source connected to the supply voltage VDD, its drain connected to the source of p-channel transistor MP3, and its gate connected to the VHPF signal; p-channel transistor MP3 having its source connected to the drain of p-channel transistor MP2, its drain connected to node B, and its gate connected to the node D; and n-channel transistor MN5 having its drain connected to node B, its source connected to ground, and its gate connected to the node D.

The photodetection circuit 10 is enabled by the ENABLE signal being at a logic high to turn on MN3. In operation, the photodetection circuit 10 alternates the RC constant at the anode of the SPAD 11 between a very low value (with enough quenching resistance that is set by the W/L ratio of MN1 and MN3) during quench, very high during hold-off, and low during recharge (higher than the very low RC value during quench, lower than the very high RC value during hold-off).

In detail, with additional reference to FIGS. 3A-3B, when a photon is detected by the SPAD 11, a rising edge of the SPAD output signal at node A quickly occurs at time t1 because the RC constant at this point is very low. Once the rising edge reaches the threshold value of the inverter 16, a falling edge will appear at the node D. Keep in mind that the inverter 17 is starved of current because the bias voltage VHPF is set at a level which constrains the current through MP2, and therefore the available current at the source of MP3 is limited, causing the inverter 17 to have a slow response time to pull its output high.

While the falling edge at the node D triggers the starved inverter 17, as explained, the fact that the inverter 17 is starved of current means that its output at node B rises slowly, as can be seen between times t1 and t2. Therefore, at the occurrence of the falling edge at the node D, the falling edge at the node D and the low voltage at node B cause the output of the OR gate 13 to go low between times t1 and t2, turning off MN1, forcing the RC constant high and maintaining the anode voltage of the SPAD 11 nearly constant, forming a nearly flat voltage plateau for a long hold off time. Once the voltage at node B rises to the threshold level of the OR gate 13 at time t2, node C will rise high, turning on MN1 fully. The fact that node B is at the threshold level of OR gate 13 (but has not reached its maximum) at t2 turns MN2 on but in linear mode (not saturation, so that it is not fully turned on) so that it acts as a resistor with a low resistance. This lowers the RC constant to lower than it was between times t1 and t2, but higher than it was prior to time t1, forming a low impedance path for rapid recharge of the SPAD 11, achieving a short dead time despite the long hold off time. This provides for the ability to fully quench the SPAD 11 while maintaining a short dead time, thereby allowing for a rapid photodetection rate.

In the above description, when referring to the RC constant, C is the internal capacitance of the SPAD 11, while R is the total resistance formed by MN1 and MN3. Depending on the biasing condition of MN1, the total resistance R changes, and therefore RC changes.

Figure 4:
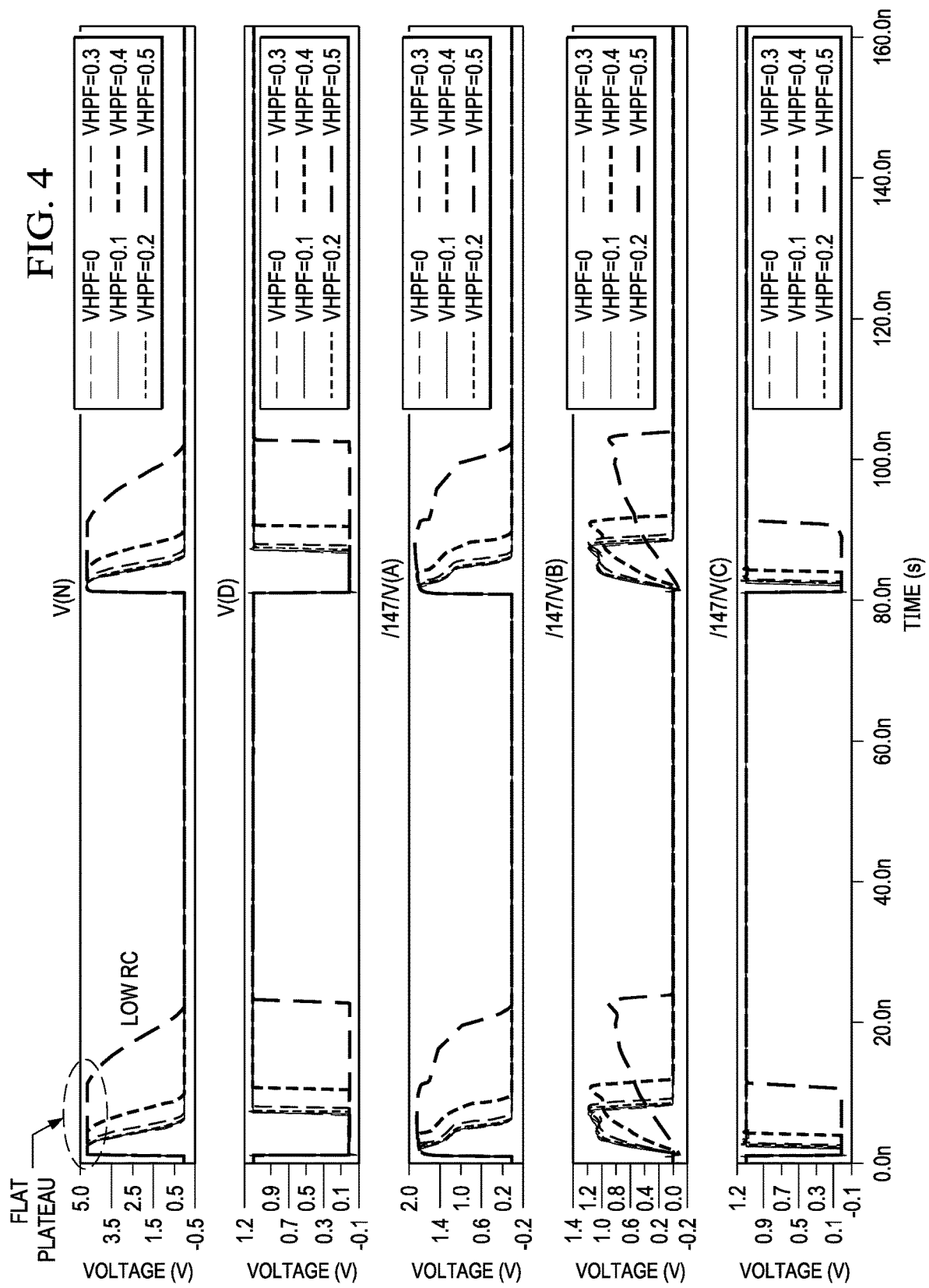
FIG. 4 is a graphing showing the effect of different values of VHPF (different levels of current starvation of the starved inverter of FIG. 2) on the anode voltage of the SPAD, as well as the voltages at nodes A, B, and C.

Note that VHPF can be tuned so as to tune the magnitude of current provided to MP3 (e.g., tune the level of current starvation of the starved inverter 17), which enables the tuning of the length of the hold off time, therefore allowing adaption of the photodetection circuit 10 to match variations in SPADs. As VHPF increases, the rise time of the voltage at node B increases, increasing the RC constant and therefore increasing the hold off time; conversely, as VHPF decreases, the rise time of the voltage at node B decreases, decreasing the RC constant and therefore decreasing the hold off time. This can be seen in FIG. 4, for example, where for example a VHPF of 0 V or 0.1 V provides for a short hold off time, but a VHPF of 0.5 V provides for a long hold off time.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A photodetection circuit, comprising:
a single photon avalanche diode (SPAD); and
an active quenching circuit coupling the SPAD to an intermediate node, the active quenching circuit having a variable RC constant, the active quenching circuit configured to:
have a first RC constant during an idle state so that when the SPAD avalanches in response to detection of a photon, quenching is begun so as to set a magnitude of a voltage at a terminal of the SPAD to a quench voltage, the quench voltage being greater than a threshold voltage;
have a second RC constant greater than the first RC constant during a hold off period during which the quenching occurs so as to maintain the voltage at the terminal of the SPAD at a magnitude that is above the threshold voltage during the hold off period; and
have a third RC constant less than the second RC constant but greater than the first RC constant during a recharge period during which the SPAD is recharged.

2. The photodetection circuit of claim 1, wherein the magnitude that is above the threshold voltage during the hold off period is substantially equal to the quench voltage.

3. The photodetection circuit of claim 1, wherein the active quenching circuit comprises a starved delayed buffer.

4. The photodetection circuit of claim 3,
wherein the SPAD has a cathode coupled to a high voltage supply and an anode;
wherein the starved delayed buffer comprises:
an inverter having an input coupled to the anode of the SPAD;
a starved inverter having an input coupled to the intermediate node to receive an output of the inverter;
a logic gate having a first input coupled to the intermediate node and a second input coupled to an output of the starved inverter;
a transistor circuit coupled between the anode of the SPAD and ground and configured to turn on in response to assertion of an output of the logic gate; and
a pull down circuit coupled to the input of the inverter and configured to have a variable resistance controlled by the output of the starved inverter.

5. The photodetection circuit of claim 4, wherein the transistor circuit comprises:
a first n-channel transistor having a drain coupled to the input of the inverter, a source coupled to ground, and a gate coupled to the output of the logic gate.

6. The photodetection circuit of claim 5, wherein the transistor circuit further comprises:
an enable n-channel transistor having a drain coupled to the anode of the SPAD, a source coupled to the input of the inverter, and a gate coupled to an enable signal.

7. The photodetection circuit of claim 5, wherein the pull down circuit comprises:
a second n-channel transistor having a drain coupled to the input of the inverter, a source coupled to ground, and a gate coupled to the output of the starved inverter.

8. The photodetection circuit of claim 4, wherein the logic gate comprises an OR gate.

9. The photodetection circuit of claim 4, wherein the starved inverter is powered between a current source and ground; and wherein the current source comprises a p-channel transistor biased by a tuning voltage.

10. The photodetection circuit of claim 1, wherein the SPAD comprises a fully depleted SPAD.

11. A method, comprising:
changing an RC constant of an active quenching circuit for a single photon avalanche diode (SPAD) to:
have a first RC constant during an idle state so that when the SPAD avalanches in response to detection of a photon, quenching is begun so as to set a magnitude of a voltage at a terminal of the SPAD to a quench voltage, the quench voltage being greater than a threshold voltage;
have a second RC constant greater than the first RC constant during a hold off period during which the quenching occurs so as to maintain the voltage at the terminal of the SPAD at a magnitude that is above the threshold voltage during the hold off period; and
have a third RC constant less than the second RC constant but greater than the first RC constant during a recharge period during which the SPAD is recharged.

12. The method of claim 11, wherein the magnitude that is above the threshold voltage during the hold off period is substantially equal to the quench voltage.

13. A photodetection circuit, comprising:
a single photon avalanche diode (SPAD); and
an active quenching circuit coupling the SPAD to an intermediate node, the active quenching circuit having a variable RC constant, the active quenching circuit configured to:
have a first RC constant during an idle state so that when the SPAD avalanches in response to detection of a photon, quenching is begun to set a magnitude of a voltage at a terminal of the SPAD to a quench voltage, the quench voltage being greater than a threshold voltage; and
have a second RC constant greater than the first RC constant during a hold off period during which the quenching occurs so as to maintain the voltage at the terminal of the SPAD at a magnitude that is above the threshold voltage during the hold off period.

14. The photodetection circuit of claim 13, wherein the magnitude that is above the threshold voltage during the hold off period is substantially equal to the quench voltage.

15. The photodetection circuit of claim 13, wherein the active quenching circuit comprises a starved buffer.

16. The photodetection circuit of claim 15,
wherein the SPAD has a cathode coupled to a high voltage supply and an anode; and
wherein the starved buffer comprises:
an inverter having an input coupled to the anode of the SPAD;
a starved inverter having an input coupled to the intermediate node to receive an output of the inverter; and a pull down circuit coupled to the input of the inverter and configured to have a variable resistance controlled by the output of the starved inverter.

17. The photodetection circuit of claim 13, wherein the SPAD comprises a fully depleted SPAD.

\* \* \* \* \*